United States Patent
Park

(10) Patent No.: US 6,178,994 B1
(45) Date of Patent: Jan. 30, 2001

(54) TAP FOR COMPRESSED OR LIQUEFIED GASES HAVING AN OVERCHARGING PREVENTION FUNCTION

(75) Inventor: Chung Mu Park, Pusan (KR)

(73) Assignee: Young Do Industrial Co., Ltd., Pusan (KR)

(*) Notice: Under 35 U.S.C. 154(b), the term of this patent shall be extended for 0 days.

(21) Appl. No.: 09/512,071

(22) Filed: Feb. 24, 2000

(51) Int. Cl.$^7$ .............. F16K 31/24; F16K 31/34
(52) U.S. Cl. ............ 137/413; 137/442; 137/446; 137/614.2; 141/18; 141/95; 141/198; 141/213
(58) Field of Search .................. 137/413, 442, 137/446, 614.2; 141/18, 95, 198, 213

(56) References Cited

U.S. PATENT DOCUMENTS

| | | | |
|---|---|---|---|
| 2,385,489 | * 9/1945 | Benz | 137/614.2 |
| 5,282,496 | * 2/1994 | Kerger | 137/446 |
| 5,460,197 | * 10/1995 | Kerger et al. | 137/413 |
| 5,487,404 | * 1/1996 | Kerger | 137/446 |
| 5,842,500 | * 12/1998 | Rockwood et al. | 137/413 |
| 5,850,849 | * 12/1998 | Wood | 137/446 |
| 5,921,272 | * 7/1999 | Cavagna | 137/414 |
| 5,992,445 | * 11/1999 | Pagani | 137/446 |
| 6,079,438 | * 6/2000 | Cavagna | 137/315.08 |

\* cited by examiner

*Primary Examiner*—George L. Walton
(74) *Attorney, Agent, or Firm*—Rosenberg, Klein & Lee

(57) ABSTRACT

There is disclosed a tap for compressed or liquefied gases having an overcharging prevention function, in which a gas can be directly infused/discharged into/from a gas storage tank, regardless of pressure/level of the liquefied gas inside/outside a gas storage tank, higher charging efficiency in the gas storage tank can be accomplished. The tap includes an upper part body provided inside with a first passage and a second passage communicating with the first passage in a perpendicular direction of the first passage, the first passage being connected to an external gas source or a gas combustion apparatus, a check valve positioned on the first passage, permitting a gas flow only to the second passage when the pressurized gas above a certain pressure level is charged from the external, a safety valve which acts when pressure of the gas inside a gas storage tank is above the preset level and then allows the gas exceeding the preset pressure level to be externally discharged, and a two-way valve having upper portion connected to the upper part body, acting to prevent the gas charged through the first and second passages from overcharging exceeding a level preset in the gas storage tank and to externally discharge the liquefied gas charged in the gas storage tank at the time of opening the check valve.

6 Claims, 6 Drawing Sheets

TAP FOR COMPRESSED OR LIQUEFIED GASES HAVING AN OVERCHARGING PREVENTION FUNCTION

BACKGROUND OF THE INVENTION

1. Field of the Invention

The present invention relates to a tap for compressed or liquefied gases, and more particularly to a tap for compressed or liquefied gases which has an overcharging prevention function, in which a two-way valve permits high speed charging a gas through an opening opened at initial state until a gas storage tank is fully filled with the liquefied gas, regardless of pressure/level of the liquefied gas inside/outside a gas storage tank, and the tap, for higher charging efficiency in the gas storage tank, has a buffering disk permitting that a level-controlling valve does not interfere with operations of a cam and a float during the charging of the gas and that an abrupt drop of the level-controlling valve is prevented at the full-filling level, so that slow blocking of the gas supply is conducted.

2. Description of the Conventional Art

Apparatuses which use gas, such as liquefied petroleum gas (LPG), liquefied natural gas (LNG), compressed natural gas (CNG), etc., need to be recharged at a gas dispensing station when a gas storage tank of the apparatus is empty.

To prevent explosion possibly occurring due to the overcharging of gas when gas is recharged in the gas storage tank, it is required to provide a safety valve which, in the case of charging the gas with a certain level of a gas pressure, automatically operates by the gas pressure in the gas storage tank and is then operated to externally discharge the overcharged gas.

For a proper operation of the safety valve, the filling level of the liquefied gas to be filled in the gas storage tank has to be retained at a certain level so that a gaseous zone can be formed at the upper side.

A prior art relating to the tap for compressed or liquefied gases has been disclosed in U.S. Pat. No. 5,282,496 issued on Feb. 1, 1994, entitled "Tap for Compressed or Liquefied". Referring to FIG. 1, the tap for compressed or liquefied gases disclosed in the above-mentioned U.S. Pat. No. 5,282,496 will be described below.

As shown in FIG. 1, the tap for compressed or liquefied gases disclosed in the above-mentioned U.S. Pat. No. 5,282,496 comprises: an upper body 10 having an inlet channel 18 communicating with the inside of the body 10, the inlet channel providing a passage for flowing a gas introduced from the external, and having an outer lower part thereof provided with a screw thread 12 enabling the tap to be screwed onto a gas storage tank; an open/closure valve 14 and a packing 16 enabling manual open/closure of the inlet channel 18; and a safety valve 26 which enables the gases to externally escape through a passage 24 in the event of abnormal overpressure of the gas inside the gas storage tank.

Further, the tap for compressed or liquefied gases comprises: a lower body 32 coupled to the inside of the gas storage tank, having a lower side thereof provided with a two-way valve 30 having a chamber 38 inside, and a central portion whose both sides form the openings 34, 36; a piston 40 which slides in the chamber 38 by the pressure of the gas infused from the inlet channel 18, while maintaining the sealing by the seal 46 and the gasket 42, and having inside a passage 48 for introducing some portions of the infused gas; a spring 44 installed at a lower portion of the piston 40, for offering a restoration force allowing the piston 40 to return to its original position; an orifice 50 formed on a side surface of the lower body 32, operated to permit the remaining gas in the chamber 38 to flow to the gas storage tank; a level-controlling valve 52 movable up and down between the opened position defined by a washer 55 and the closure positions defined by the seal 54; a cam 56 rotatably supported by the arms 58, and for driving the level-controlling valve 52; a float 62 for driving the cam 56 by a descent/ascent motion depending upon the varying pressure (level) in the gas storage tank; and a two-way valve 30 installed between the passage 48 and the chamber 38, having a pendulum 64 serving to stop the gas supply through the channel 66 formed inside, when the tank is tilted.

A description will now be given of the operation of the conventional tap for compressed or liquefied gases as described above.

With the connector 22 being connected to a gas source outside the gas storage tank, a user opens the open/closure valve 14, so that the pressurized gas penetrates through the inlet channel 18. The pressurized gas pushes downward the piston 40 against the action of the spring 44, and the gas is infused into the gas storage tank through the openings 34, 36. Also, some portion of the gas penetrates through the passage 48 of the piston 40 to the lower part of the chamber 38 and flows around the level-controlling valve 52, in the compulsorily open position by the cam 56, into the gas storage tank.

As the tank fills up, the float 62 rises, thus resulting in a counter-clockwise pivoting of the cam 56. When the cam 56 pivots in a counter-clockwise direction, the top of the cam 56 brings into contact with a lower end of the valve 52, followed by the cam 56 starting to present a hollow part 56a to the level-controlling valve 52 and then a descent of the valve 52 through the effect of the pressure of the filling gas.

As a result, the level-controlling valve 52 comes into contact with the seal 54, which permits the stop of the gas supply into the gas storage tank through the level-controlling valve 52. The stop of the gas supply into the tank induces the increase in pressure inside the chamber 38 formed between the piston 40 and the level-controlling valve 52, and thus the piston 40 moves upward by the restoration force of the spring 44.

Consequently, the closure of the openings 34, 36 by the piston 40 stops the gas supply into the tank, which thus prevents the overcharging of the gas in order to maintain the preset level of the charged gas.

Meanwhile, the pendulum 64 serves to stop the gas supply through the channel 66 formed inside, when the tank is tilted.

However, since the above known tap for compressed or liquefied gases utilizes the scheme that the openings 34, 36 are opened when the pressure of the infused gas pushes downward the piston 40 supported against the spring 44 in order to infuse the gas, it needs to maintain the pressure above a certain level of the pressure. This causes a problem in that the size of the opening closely relating to the pressure of the gas is confined below a certain size.

In the case of the opening 34, 36 larger than a certain size, the reduction in the pressure of the gas by an amount corresponding to the increase in size of the opening presents, which induces partial closure of the opening caused by the rise of the piston 40 due to the restoration force of the spring 44. This results in the reduction in size of the opening. Therefore, there is a problem in that the charging speed is limited depending upon the size of the opening which is defined by the pressure of the gas and the restoration force of the spring.

Further, under non-loaded condition of the conventional tap for compressed or liquefied gases, the piston closes the inlet channel 18 by the action of the spring. At this time, when the handle is rotated to open the packing 16 in order to use the stored gas, only a single gas flow path for externally discharging the gas exists which path leads to the inner passage in the piston 48 through the passage between the nut 51 and the level-controlling valve 52.

In this case, since the diameter of the inner passage 48 is about 1.18 mm, maximum heat quantity permitted to be externally discharged is about 125,000 BTU/Hour, which quantity is considerably small. This means that a gas discharging quantity per time unit is small.

With such a retarded discharging/charging structure, a problem is caused in that a long time of about 12 minutes is taken to purge the empty gas storage tank, wherein the purging is needed to remove moisture vapor and air contained in the empty tank using four to five times the Freon-gas or LP-gas.

Moreover, during the gas charge using the above known tap for compressed or liquefied gases, the pressure of the charging gas is directly applied to the top surface of the level-controlling valve 52. Thus, the frictional force between the level-controlling valve and the cam 56 increases, which may interfere with the proper motions of the lever and the float 62 following the rise of the level of the liquefied gas.

Further, the hollow part 56a of the cam 56 almost resembles a U-shaped configuration, as shown in FIGS. 1 and 2. Therefore, immediately before a full charging level, there occurs a sudden drop of the level-controlling valve 52 by a distance corresponding to a fall height H, about 10 mm, of the cam 56 in order to prevent the overcharging of the gas. Further, such a level-controlling valve 52 in turn closes a passage between the nut 51 and the level-controlling valve 52, followed by the rise of the piston 48 which terminates the charging of the gas and an abrupt bounce of the float 62.

As a result, these phenomena yield problems in that even if there is room to further charge the gas in the gas storage tank, the gas supply is no longer further continued, thus resulting in the reduced charging efficiency due to deficiency of the gas by an amount corresponding to the fall height H.

SUMMARY OF THE INVENTION

Therefore, it is an object of the present invention to solve the above-mentioned problems and to provide a tap for compressed or liquefied gases which has an overcharging prevention function, the tap being capable of high speed charging a gas through an opening opened at initial state until a gas storage tank is fully filled with the liquefied gas, regardless of pressure/level of the liquefied gas inside/ outside a gas storage tank, and of, in the case of the overcharging of the gas exceeding a preset level, improving a relative speed of charging the gas through the closure of the opening by means of a charging level detecting means.

Another object of the present invention is to provide a tap for compressed or liquefied gases which has an overcharging prevention function and a faster purging function of a gas storage tank through a prompt charging/discharging of the gas using an opening opened at non-loaded or initial state.

Further, another object of the present invention is to provide a tap for compressed or liquefied gases which has an overcharging prevention function, the tap, for higher charging efficiency in the gas storage tank, having a buffering disk permitting that a level-controlling valve does not interfere with operations of a cam and a float during the charging of the gas and that an abrupt drop of the level-controlling valve is prevented at the full-filling level, so that slow blocking of the gas supply is conducted.

To accomplish the above-mentioned objects, according to the present invention, there is provided a tap for compressed or liquefied gases, having an overcharging prevention function, the tap comprising: an upper part body provided inside with a first passage and a second passage communicating with the first passage in a perpendicular direction of the first passage, the first passage being connected to an external gas source or a gas combustion apparatus; a check valve positioned on the first passage, permitting a gas flow only to the second passage when the pressurized gas above a certain pressure level is charged from the external; a safety valve which acts when pressure of the gas inside a gas storage tank is above the preset level and then allows the gas exceeding the preset pressure level to be externally discharged; and a two-way valve having upper portion connected to the upper part body, acting to prevent the gas charged through the first and second passages from overcharging exceeding a level preset in the gas storage tank and to externally discharge the liquefied gas charged in the gas storage tank at the time of opening the check valve.

Said two-way valve is characterized in that the two-way valve comprises: a body provided inside with a third passage communicating with the second passage, the third passage being axially located by a first to third inner diameter parts which sequentially increase, and having at least one or more openings communicating with the inside of the gas storage tank and located at the second inner diameter part, a flux valve provided inside with a fourth passage communicating with the third passage, and acting to set the first inner diameter part of the body in a opened or closed condition, an elastic spring imposing a force permitting a descent of the flux valve, a nut whose outer peripheral is coupled to the third inner diameter part of the body, and provided inside with a stepped fifth passage communicating with the fourth passage, a buffering disk fixed to a lower end of the flux valve by means of the nut and between the fourth and fifth passages, and having a plurality of through-holes for absorbing an abrupt pressure change between the fourth and fifth passages, a level-controlling valve which sets the valve between the disk inside the fifth passage and the stepped portion in an opened or closed condition, and having elasticity loaded thereto, the elasticity acting in a downward direction so as to maintain the closed condition at the non-loaded condition, and means for detecting a charging level in order to set the level-controlling valve in an opened condition until the detected charging level inside the gas storage tank reaches the preset level, and to set the level-controlling valve in a closed condition in the case of reaching the preset level.

Further, both the level-controlling valve and the flux valve are set in opened conditions when the gas storage tank has a level below the preset level and its first passage is connected to the gas source, and when the level inside the tank reaches the preset level and the first passage has no load, the level-controlling valve is set in closed condition and the flux valve set in opened condition.

Further, when the level inside the tank reaches the preset level and the first passage is connected to the gas combustion apparatus, the level-controlling valve is set in closed condition and the flux valve set in opened condition.

In this case, the charging level detecting means comprises: a cam, on upper surface thereof, having a certain curvature surface for setting the opened condition of the level-controlling valve until the charging level reaches the preset level and a V-shaped hollow surface for setting the closed condition of the level-controlling valve in order to block the charging of the gas when the charging level reaches the preset level; and a float attached to the arm extended along the V-shaped hollow surface of the cam, and for moving upward/downward depending on the level of the charging gas to pivot the cam.

Preferably, said flux valve is located to slide up and down inside the third passage, and has a first and third outer diameter parts corresponding the first and third outer diameter parts of the flux valve, and the flux valve further comprises a sealing packing for in leakproof manner engaging the first inner diameter part with a stepped portion formed between the first and second outer diameter parts of the flux valve.

According to the present invention, the tap provides a high speed charging of a gas through an opening opened at initial state until a gas storage tank is fully filled with the liquefied gas, regardless of pressure/level of the liquefied gas inside/outside a gas storage tank, and also provides, in the case of the overcharging of the gas exceeding a preset level, the rise of a relative speed of charging the gas through the closure of the opening by means of a charging level detecting means. In this case, the size of the opening can be suitably taken regardless of the pressure of the charging gas.

Further, according to the present invention, there is provided a faster purging function of a gas storage tank through a prompt charging/discharging of the gas using an opening opened at non-loaded or initial state, and a higher charging efficiency in the gas storage tank in that a level-controlling valve does not interfere with operations of a cam and a float during the charging of the gas and that an abrupt drop of the level-controlling valve is prevented at the full-filling level, so that slow blocking of the gas supply is conducted.

DETAILED DESCRIPTION OF THE INVENTION

Figure 1:
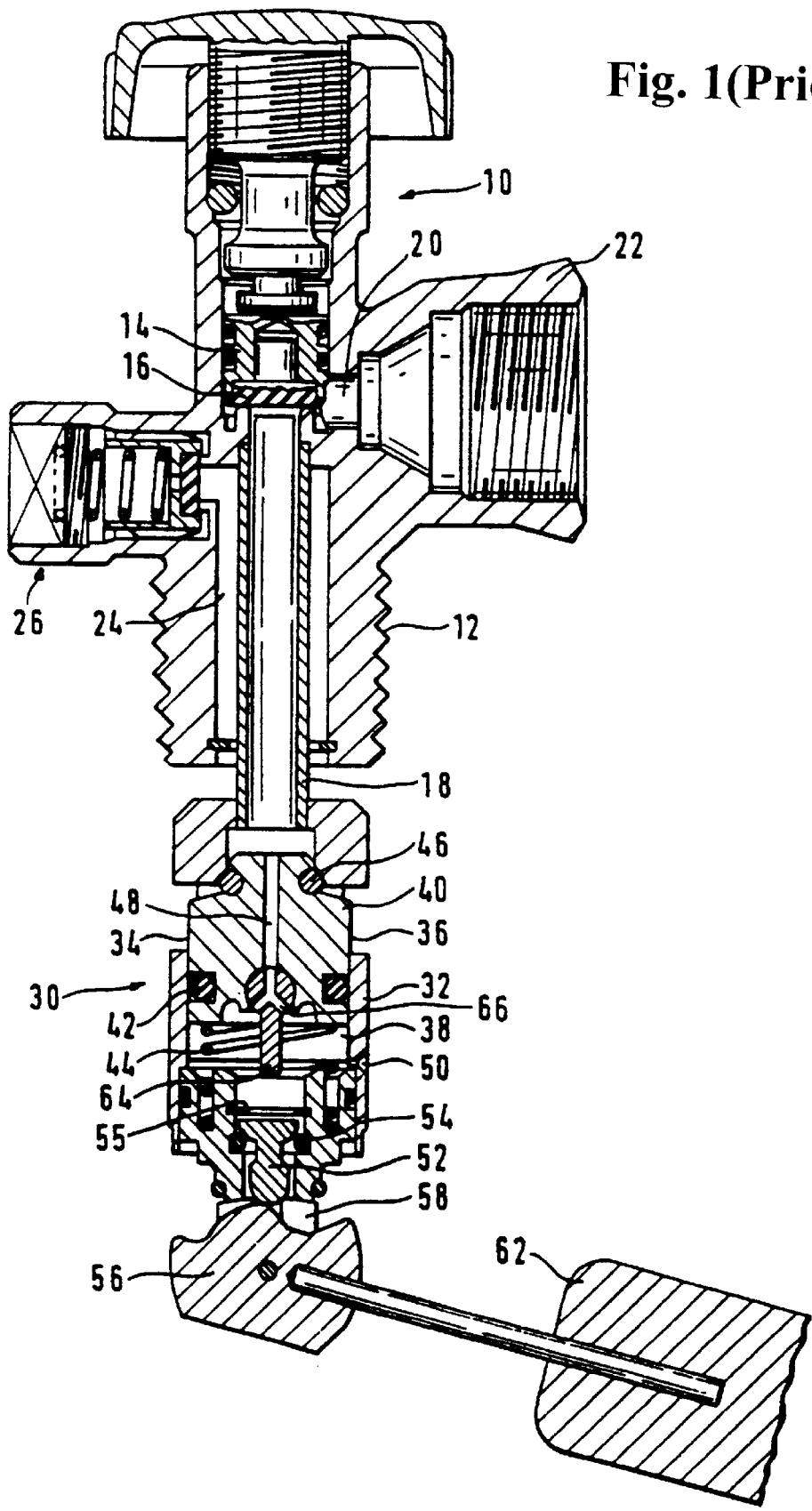
FIG. 1 shows a structure of a conventional tap for compressed or liquefied gases which has an overcharging prevention function.
Figure 2:
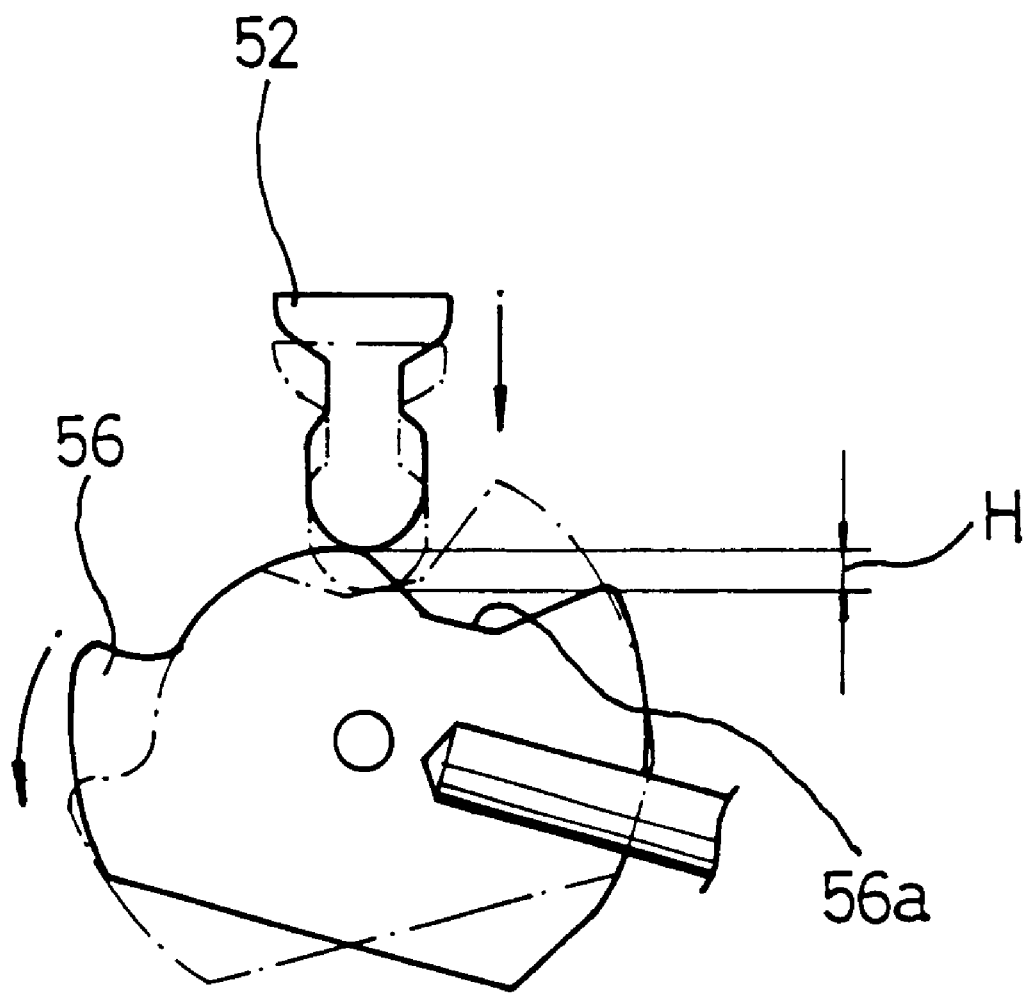
FIG. 2 shows a diagram for explaining an operation of a cam in a conventional tap.
Figure 3:
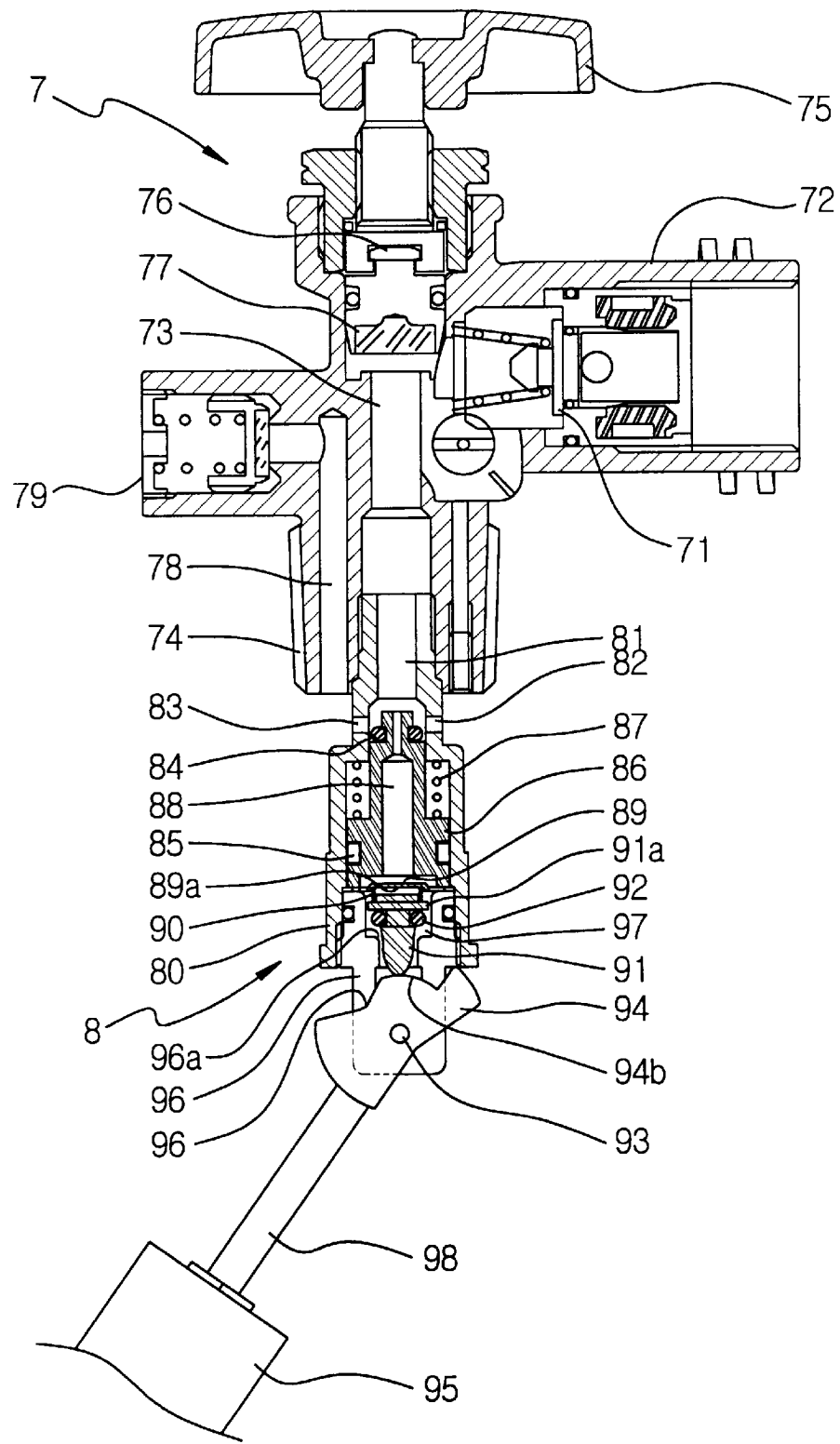
FIG. 3 shows a whole configuration of a tap for compressed or liquefied gases which has an overcharging prevention function in accordance with an embodiment of the present invention.
Figure 4:
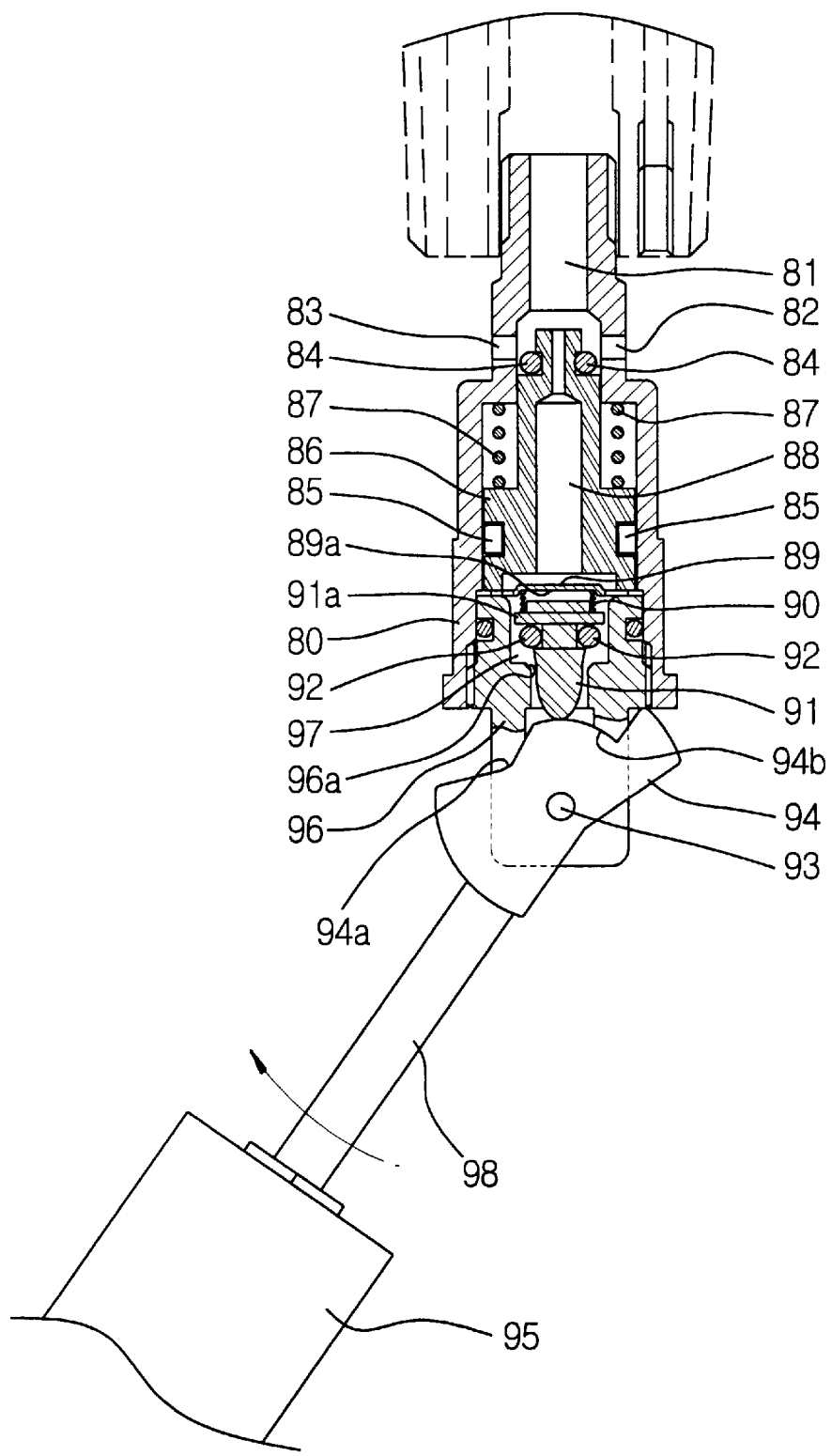
FIG. 4 shows main parts in FIG. 3 under a low level of the charged gas.
Figure 5:
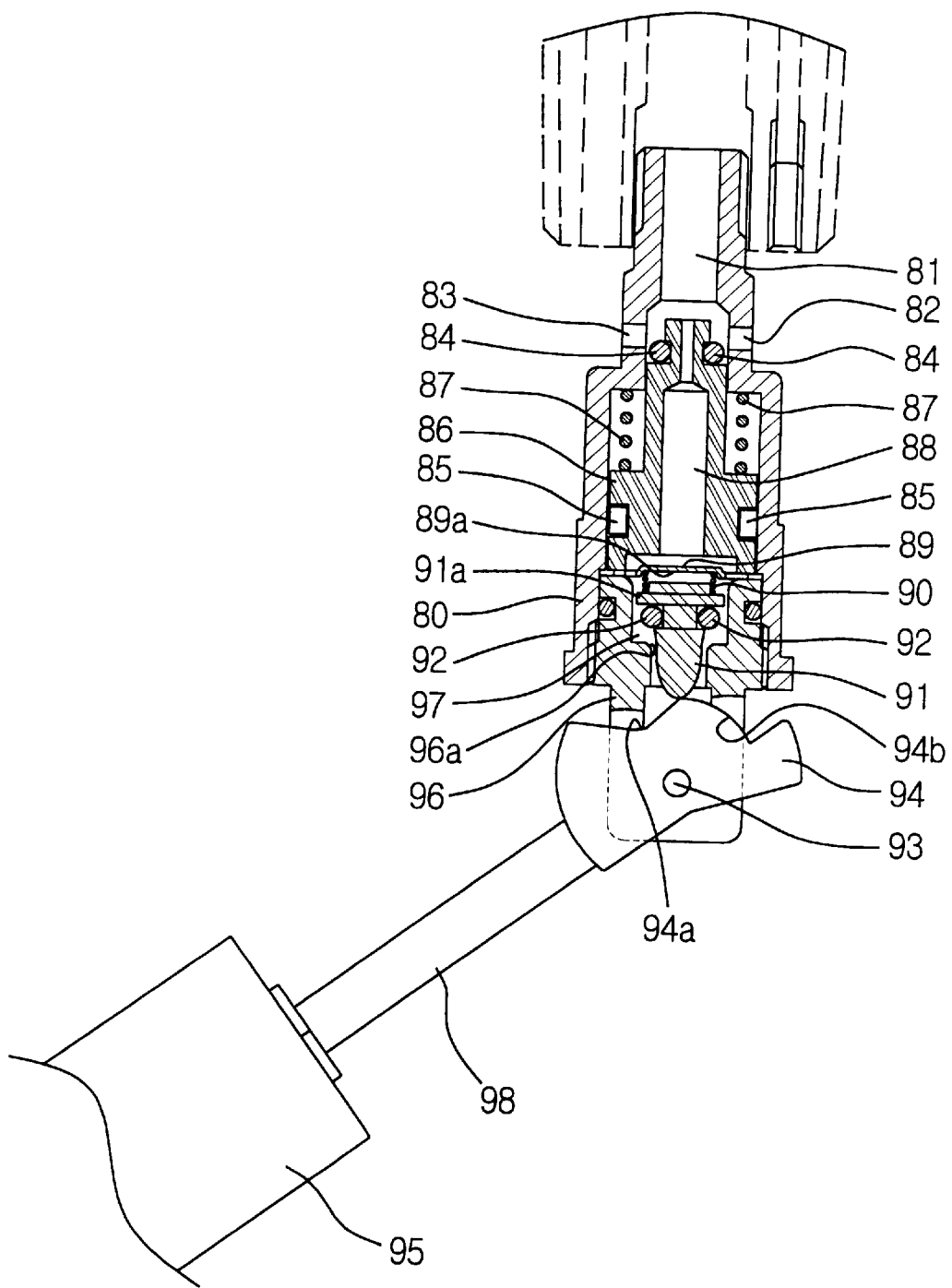
FIG. 5 shows main parts in FIG. 3 during the charging of the gas.

A preferred embodiment of the present invention will be described below, with reference to the accompanying drawings.

It is noted that although a specified embodiment herein set forth among various examples is described for a better understanding of the present invention, the example is meant to be illustrative and not restrictive.

As shown in FIGS. 3 to 6, a tap for compressed or liquefied gases which has an overcharging prevention function generally comprises an upper part body 7 having a handle 75 operated by a user for suppling or stopping the gas, and having an inlet leading to a horizontal passage which is connected to an external gas source outside a gas storage tank (not shown); and a two-way valve 8 combined into a lower part of the upper part body 7 and mounted in the gas storage tank, for delivering the gas infused through an inlet channel 73 of the upper part body 7 or discharging the gas, and for preventing the overcharging of the gas.

The upper part body 7 is provided with the inlet channel 73 for flowing the gas infused from the external by way of the connector 72, and has a lower part thereof having an outer portion provided with a screw thread 74 enabling the tap to be screwed onto the gas storage tank.

The check valve 71 is opened by the pressure of the gas when the gas is charged inside the tank, and prohibits the gas contained in the tank from being externally discharged. However, in the case of externally discharging the gas contained in the tank, a regulator may be combined to open the check valve 71 such that the gas is externally discharged.

Also, the upper part body 7 is provided with a stem 76 and a disk 77, which the stem 76 permits an opening/closing of the inlet channel 73 in manual manner when the handle 73 is rotated. The body 7 is also provided with a safety valve 79 used to externally discharge the gas through a passage 78 when the pressure inside the tank is beyond a certain level.

The two-way valve 8 has a valve body 80 fixedly screwed onto the inlet channel 73 of the upper part body 7, is provided inside with a passage 81 connected to the inlet channel 73 and having discretely different diameters thereof, and has a central portion whose both sides form the openings 82, 83.

Inside the passage 81 is slidably inserted a flux valve 86 provided inside with a passage 88 for flowing some portion of the infused gas, while the flux valve 86 is sealed with an aid of a sealing packing 84 and a back-up ring 85.

Also, the two-way valve 8 has a spring 87 installed between the upper portion of the flux valve 86 and the stepped portion inside the body 80, the spring offering elasticity in a downward direction so as to maintain the opened position of the flux valve 86 at a normal state. Further, the two-way valve 8 has a disk 89 fixed to a lower end of the flux valve 86 by means of the nut 96, the disk being used for buffering a sudden pressure change of the gas delivered through the passage 88.

A central portion of the disk 89 forms an upward groove 89a. The peripheral portion of the disk 89 has a plurality of through-holes (not shown) through which the gas penetrates.

The nut 96 is provided inside with a passage 97, communicating with the passage 88, whose central portion forms a inwardly stepped portion. Between the stepped portion 96a and the groove of the disk 89, there is a level-controlling valve 91 being subject to a downward action of the spring 90.

The level-controlling valve 91 has a rear end to which a flange 91a having a diameter larger than that of the stepped portion 96a is formed, and a rounded front end movable up and down in the passage 97. A sealing packing 92 is combined into a lower side of the flange 91a of the level-controlling valve 91.

The lower end of the level-controlling valve 91 is in contact with an upper surface of a cam 94 having a certain curvature part 94b and "V"-shaped hollow part 94a on the upper surface thereof. The cam 94 has a pivoting axis 93 rotatably supported by a pair of arms extended from the nut 97, and one side thereof connected to a float 98 by means of a lever 98, wherein the float 95 descends and ascends depending upon the varying level of the liquefied gas in the gas storage tank.

The operation of the tap for compressed or liquefied gases having overcharging prevention function in accordance with an embodiment of the present invention will be described below.

The connector 72 is connected to a gas source outside the gas storage tank and the rotation of the handle 75 is made to permit the opening of the stem 76 and the disk 77. Then, a high pressure gas is introduced into the inlet channel 73 by way of the check valve 71, directly to the gas storage tank through the passage 81 of the two-way valve 8 and then the openings 82, 83. This results in a faster filling of gas in accordance with the present invention.

When the gas storage tank remains in initial condition or is not fully filled with the gas therein, the flux valve 86 and the seal packing 84 are subject to elasticity of the spring 87 and are thereby located in a position lower than that of the openings 82, 83. Therefore, the openings 82, 83 remain opened.

Some portions of gas introduced through the passage 81 as described above flows around the level-controlling valve 91 through a passage 88 formed inside the flux valve 86 and then a passage formed in the disk 89. In this case, with the rise of the level-controlling valve 91, which also compresses the spring 90, by the cam 94, at the filling level of the gas (See FIG. 4), the gas having arriving around the level-controlling valve 91 is then supplied into the gas storage tank through a passage 97 between the nut 96 and the level-controlling valve 91.

The pressurized gas having penetrating through the passage 81 directly presses the level-controlling valve 91, and the pivoting of the cam 84 abutting against the valve 91 is caused as the float 95 rises with an increase in the rise of the level of the liquefied gas. When the cam 84 pivots, friction may interfere with the pivoting of the cam 94. The provision of the disk 89 is needed to prevent such an interference.

On the other hand, with an infusion of high pressure gas into the gas storage tank, the level of liquefied gas rises, thus causing the rise of the float 95.

Figure 6:
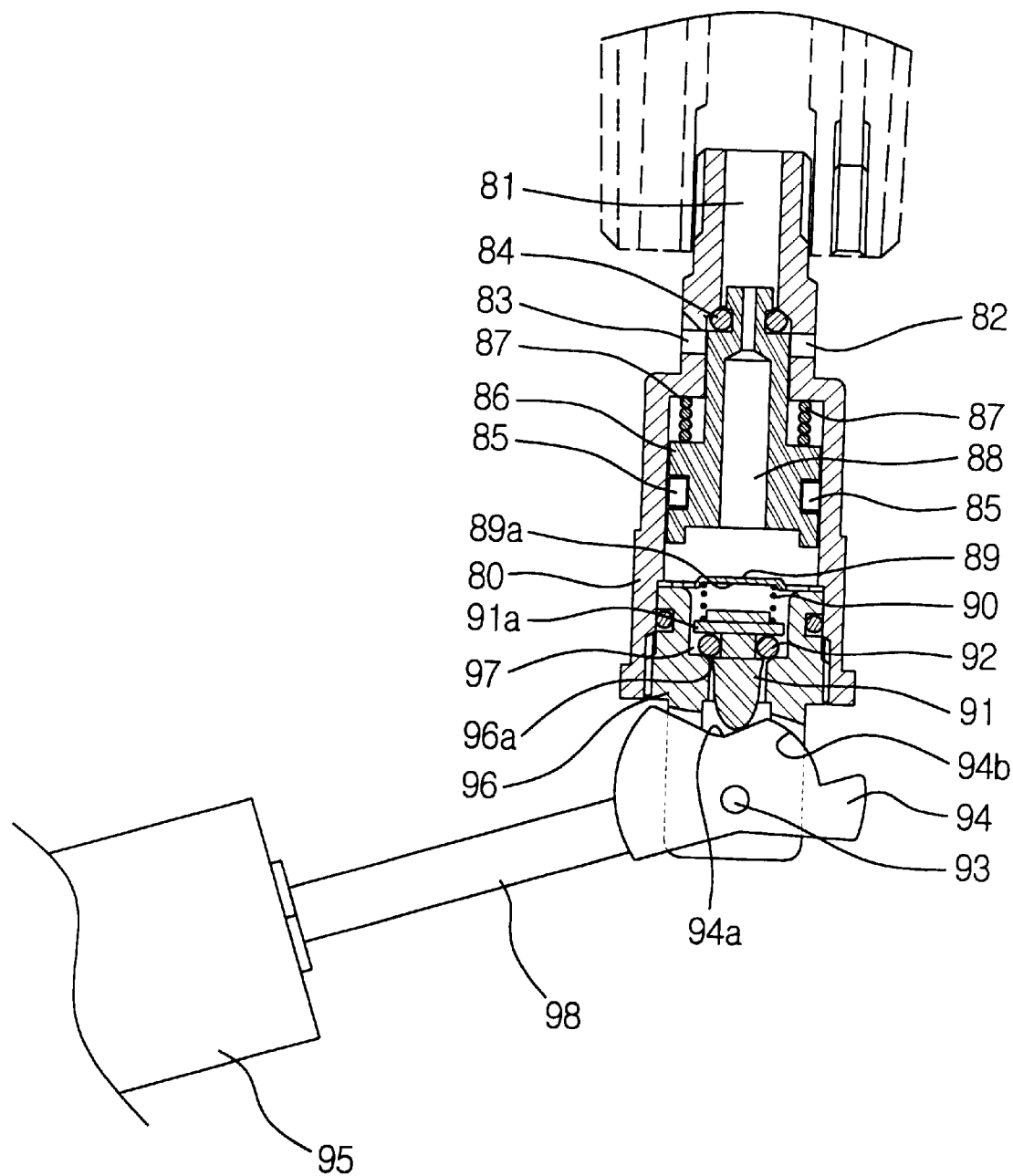
FIG. 6 shows main parts in FIG. 3 under a full-charging level of the gas.

When the cam 94 clockwise pivots on the pivoting axis 93, the top of the cam 94 brings into contact with the level-controlling valve 91 (see FIG. 5), followed by a slow descent of the level-controlling valve 91 along a hollow part 94a of a V-shape configuration, as shown in FIG. 6.

In this case, if the level of liquefied gas reaches the predetermined full filling level of gas, i.e, a lower end of the level-controlling valve 91 transits from a part 94b having a certain curvature to the "V"-shaped hollow part 94a, a sudden rise of the float 95 may occur. The disk 89 acts to prevent such an occurrence.

A direct effect of the pressure of infused gas against the top surface of the level-controlling valve 91 can be blocked by the disk 89 having four small through-holes formed therein. Therefore, even when the lower end of the level-controlling valve 91 transits to the hollow part 94a, an abrupt descent of the level-controlling valve 91 can be prevented.

As a result, the phenomenon in the prior art can be prevented which the filling of gas up to the preset filling level could not be accomplished due to an abrupt rise of the float. In other words, the level-controlling valve 91 slowly descends along V-shaped hollow part of the cam 94 by restoration force of the spring 90, thereby the liquefied gas being charged into the gas storage tank up to the preset filling level.

As shown in FIG. 6, at the full descent of the level-controlling valve 91, the seal packing 92 engages with the seat of the valve in a leakproof manner. Therefore, the supply of the gas, which is infused into the gas storage tank through the passage 97 between the level-controlling valve 91 and the nut 96, is stopped.

When the gas passage through the level-controlling valve 91 is blocked, the pressure inside the passage of the flux valve 86 becomes larger than elasticity force of the spring 87. Increase in pressure inside the passage causes the flux valve 86 to be elevated to a position permitting the closure of the valve by the gas pressure, where the seal packing 84 engages with the seat of the valve 86 in leakproof manner and the openings 82, 83 are closed by the flux valve 86, so that the supply of the gas having been infused into the gas storage tank is also blocked. Thus, the overcharging of the gas into the gas storage tank above a certain level can be prevented.

On the other hand, after the charging of the gas is finished, a gas source connected to the connector 72 is isolated. Under such non-loaded condition, the check valve 71 is closed again, and the flux valve 86 descends again to a descent position where the seat of the valve is released by the restoration force of the spring 87. In this case, two openings 82, 83 also remains opened.

In this condition, when the liquefied gas charged in the gas storage tank is discharged from the tank in order to use the gas, a regulator may be connected to the connector 72 to open the check valve 71. This results in a faster discharge of the gas through the openings 82, 83 in opened position, the passage 81 and then the inlet channel 73, into the external.

With an existence of the disk 89 which can act as a buffer inside the two-way valve 80, the level-controlling valve 91 maintains its descent position as a sealed condition such that the gas discharging path through the passages 97, 88 cannot be established and the flux valve 86 remains opened.

Therefore, since the gas discharge through the openings 82, 83 is made through a larger diameter part, a measured heat quantity becomes above a minimum 1,500,000 BTU/Hour. Thus, the tap of the present invention can be used in a considerably larger capacity of gas combustion, as compared with the prior art.

Further, such a faster gas discharge/recharge allows the purging time to be reduced. According to the present invention, the measured purging time is about two minutes, which means much faster purging time, as compared with the prior art having a purging time of 12 minutes.

According to the present invention, since both the level-controlling valve and the flux valve are set in opened positions when the gas storage tank has a level below the preset level and its first passage is connected to the gas source, a faster charging of the gas becomes possible through the opening and the level-controlling valve.

When the level inside the tank reaches the preset level and the first passage has no load, the level-controlling valve is set in closed position and the flux valve is set in opened position. Also, when the level inside the tank reaches the preset level and the first passage is connected to the gas combustion apparatus, the level-controlling valve is set in closed position and the flux valve is set in opened position. Therefore, the discharge of the gas can be quickly performed.

Accordingly, it is made possible a high speed charging of a gas through an opening opened at initial state until a gas storage tank is fully filled with the liquefied gas, regardless of pressure/level of the liquefied gas inside/outside a gas storage tank. Also, in the case of the overcharging of the gas exceeding a preset level, the opening is closed by a charging level detection.

Further, according to the present invention, there is provided a faster purging function of a gas storage tank through a prompt charging/discharging of the gas through the use of an opening which remains opened at non-loaded or initial state, and a higher charging efficiency in the gas storage tank in that a level-controlling valve does not interfere with operations of the cam and the float during the charging of the gas and that an abrupt drop of the level-controlling valve is prevented at the full-filling level, so that a slow blocking of the gas supply is performed.

In the art field pertaining to a tap for compressed or liquefied gases which has an overcharging prevention function, the present invention having the above-mentioned advantages is widely applicable within a scope of the present invention without deviating from the scope of the present invention.

What is claimed is:

1. A tap for compressed or liquefied gases which has an overcharging prevention function, the tap comprising:

an upper part body provided inside with a first passage and a second passage communicating with the first passage in a perpendicular direction of the first passage, the first passage being connected to an external gas source or a gas combustion apparatus;

a check valve positioned on the first passage, permitting a gas flow only to the second passage when the pressurized gas above a certain pressure level is charged from the external;

a safety valve which acts when pressure of the gas inside a gas storage tank is above the preset level and then allows the gas exceeding the preset pressure level to be externally discharged; and a two-way valve having upper portion connected to the upper part body, acting to prevent the gas charged through the first and second passages from overcharging exceeding a level preset in the gas storage tank and to externally discharge the liquefied gas charged in the gas storage tank at the time of opening the check valve, wherein the two-way valve comprises:

a body provided inside with a third passage communicating with the second passage, the third passage being axially located by a first to third inner diameter parts which sequentially increase, and having at least one or more openings communicating with the inside of the gas storage tank and located at the second inner diameter part, a flux valve provided inside with a fourth passage communicating with the third passage, and acting to set the first inner diameter part of the body in a opened or closed condition, an elastic spring for imposing a force permitting a descent of the flux valve, a nut whose outer peripheral is coupled to the third inner diameter part of the body, and provided inside thereof with a stepped fifth passage communicating with the fourth passage, a buffering disk fixed to a lower end of the flux valve by means of the nut and between the fourth and fifth passages, and having a plurality of through-holes for absorbing an abrupt pressure change between the fourth and fifth passages, a level-controlling valve which sets the valve between the disk inside the fifth passage and the stepped portion in an opened or closed position, and to which elasticity is loaded, the elasticity acting in a downward direction so as to maintain the closed position at the non-loaded condition, and means for detecting a charging level in order to set the level-controlling valve in an opened position until the detected charging level inside the gas storage tank reaches the preset level, and to set the level-controlling valve in a closed position in the case of reaching the preset level.

2. The tap as claimed in claim 1, wherein both the level-controlling valve and the flux valve are set in opened positions when the gas storage tank has a level below the preset level and its first passage is connected to the gas source; and wherein when the level inside the tank reaches the preset level and the first passage has no load, the level-controlling valve is set in closed position and the flux valve set in opened position.

3. The tap as claimed in claim 1, wherein when the level inside the tank reaches the preset level and the first passage is connected to the gas combustion apparatus, the level-controlling valve is set in closed position and the flux valve set in opened position.

4. The tap as claimed in claim 1, wherein the charging level detecting means comprises:

a cam, on upper surface thereof, having a certain curvature surface for setting the opened position of the level-controlling valve until the charging level reaches the preset level and a V-shaped hollow surface for setting the closed position of the level-controlling valve in order to block the charging of the gas when the charging level reaches the preset level; and a float attached to arm extended along the V-shaped hollow surface of the cam, and for moving upward/downward depending on the level of the charging gas to pivot the cam.

5. The tap as claimed in claim 1, wherein the flux valve is located to slide up and down inside the third passage, and has a first and third outer diameter parts corresponding the first and third outer diameter parts of the flux valve, and wherein the flux valve further comprises a seal packing for in leakproof manner engaging the first inner diameter part with a stepped portion formed between the first and second outer diameter parts of the flux valve.

6. A two-way valve acting to prevent the overcharging of a tap for compressed or liquefied gases and to externally discharge the liquefied gas charged, the tap being connected with a gas storage tank through a first passage and a second passage communicating with the first passage in a perpendicular direction of the first passage, the first passage being connected to an external gas source or a gas combustion apparatus, the two-way valve comprising:

a body provided inside with a third passage communicating with the second passage, the third passage being axially located by a first to third inner diameter parts which sequentially increase, and having at least one or more openings communicating with the inside of the gas storage tank and located at the second inner diameter part;

a flux valve provided inside thereof with a fourth passage communicating with the third passage, and acting to set the first inner diameter part of the body in a opened or closed condition;

an elastic spring for imposing a force permitting a descent of the flux valve;

a nut whose outer peripheral is coupled to the third inner diameter part of the body, and provided inside thereof with a stepped fifth passage communicating with the fourth passage;

a buffering disk fixed to a lower end of the flux valve by means of the nut and between the fourth and fifth passages, and having a plurality of through-holes for absorbing an abrupt pressure change between the fourth and fifth passages;

a level-controlling valve which sets the valve between the disk inside the fifth passage and the stepped portion in an opened or closed position, and to which elasticity is loaded, the elasticity acting in a downward direction so as to maintain the closed position at the non-loaded condition; and means for detecting a charging level in order to set the level-controlling valve in an opened position until the detected charging level inside the gas storage tank reaches the preset level, and to set the level-controlling valve in a closed position in the case of reaching the preset level.

* * * * *